United States Patent
Park

(10) Patent No.: US 8,006,278 B2
(45) Date of Patent: Aug. 23, 2011

(54) MANAGEMENT METHOD OF OPTION FOR CAPTION DISPLAY

(75) Inventor: Tae Jin Park, Sungnam-si (KR)

(73) Assignee: LG Electronics Inc., Seoul (KR)

( * ) Notice: Subject to any disclaimer, the term of this patent is extended or adjusted under 35 U.S.C. 154(b) by 1677 days.

(21) Appl. No.: 10/864,437

(22) Filed: Jun. 10, 2004

(65) Prior Publication Data

US 2004/0252234 A1    Dec. 16, 2004

(30) Foreign Application Priority Data

Jun. 12, 2003 (KR) .................. 10-2003-0037792

(51) Int. Cl.
 *H04N 7/08* (2006.01)
 *H04N 7/00* (2006.01)
 *H04N 5/50* (2006.01)
 *G06F 3/00* (2006.01)
 *G06F 3/048* (2006.01)

(52) U.S. Cl. ........ 725/137; 715/747; 715/780; 715/810; 348/468; 348/569

(58) Field of Classification Search .................. None
 See application file for complete search history.

(56) References Cited

U.S. PATENT DOCUMENTS

| | | | | |
|---|---|---|---|---|
| 4,626,892 A | * | 12/1986 | Nortrup et al. | 348/569 |
| 5,796,423 A | * | 8/1998 | Robbins et al. | 725/151 |
| 5,959,624 A | * | 9/1999 | Johnston et al. | 715/746 |
| 6,320,621 B1 | * | 11/2001 | Fu | 348/465 |
| 6,614,454 B1 | * | 9/2003 | Livingston | 715/781 |
| 2002/0122136 A1 | * | 9/2002 | Safadi et al. | 348/465 |
| 2005/0251849 A1 | * | 11/2005 | Telyuk | 725/137 |

* cited by examiner

*Primary Examiner* — William Trost, IV
*Assistant Examiner* — James R Marandi
(74) *Attorney, Agent, or Firm* — Birch, Stewart, Kolasch & Birch, LLP

(57) ABSTRACT

Provided is a method of an option for caption display, including: displaying a detail item for the option for the caption display, the detail item being comprised of a 'Style' item having 'Set By Program', 'Custom' and 'manufacture', and a plurality of lower items; selecting one of the 'Set By Program', the 'Custom' and the 'manufacture' as the 'Style item'; and setting the plurality of lower items depending on the selected 'Style' item.

3 Claims, 5 Drawing Sheets

MANAGEMENT METHOD OF OPTION FOR CAPTION DISPLAY

This Non-provisional application claims priority under 35 U.S.C. §119(a) on Patent Application No(s). 10-2003-0037792 filed in Korea on Jun. 12, 2003, the entire contents of which are hereby incorporated by reference.

BACKGROUND OF THE INVENTION

1. Field of the Invention

The present invention relates to a broadcast receiving apparatus, and more particularly, to a management method of setting an option for a caption that is displayed through a broadcast receiving apparatus.

2. Description of the Related Art

Generally, a broadcast receiving apparatus refers to an apparatus for receiving a broadcast signal from a transmission side and displaying the received broadcast signal on a screen. The broadcast receiving apparatus can be one of a television set, a settop box and a broadcast reception card for a computer.

The broadcast receiving apparatus receives a caption broadcast signal as well as an AV broadcast signal viewed by a viewer. The caption broadcast signal can include information relating with the AV broadcast signal, additional information or the like.

As a caption broadcasting way, there are an open caption and a closed caption. In the open caption, the caption broadcast signal is transmitted for an active duration of the AV broadcast signal by a transmission side (for example, broadcasting station) and is forcibly displayed on a screen irrespective of a viewer's intention. In the closed caption, the caption broadcast signal is transmitted for a non-active duration and is selectively displayed on the screen by the viewer.

Since the caption broadcast signal is transmitted for the active duration of the AV broadcast signal in the open caption, the caption broadcast signal is displayed together with the AV broadcast signal irrespective of whether viewer's selection or not. To the contrary, in the closed caption, the caption broadcast signal is transmitted for the non-active duration of the AV broadcast signal, and is selectively displayed on the screen depending on whether the viewer's selection or not. Accordingly, in the open caption, the caption broadcast signal is unconditionally displayed together with the AV broadcast signal, whereas in the closed caption, the caption broadcast signal can be displayed on the screen only in case where the viewer selects.

The closed caption has been developed for the hearing-disabled or the old having a difficulty in listening an audio signal. In the United States, a caption broadcast using the closed caption has been already implemented in 1978. The caption broadcast using the closed caption is greatly helpful in learning a foreign language.

In the meantime, the Federal Communications Commissions (FCC) of the United States regulates that the broadcast receiving apparatus having a predetermined size of screen imperatively has a function of the closed caption. As the broadcast environment is shifted from an analogue age to a digital age, the closed caption has been developed to have more reinforced function. Accordingly, the FCC regulates that a function of Digital Television Closed Caption (Hereinafter, referred to as "DTVCC") is provided in all broadcast receiving apparatus having a predetermined size of screen.

Further, the FCC compels the broadcast receiving apparatus to necessarily have viewer's selecting data for the detail item for an option of the closed caption as in Table 1 as well as contents included in the DTVCC caption signal. The detail item of the closed caption can include 'font size' item, 'font Style item, 'foreground color' item, 'foreground opacity' item, 'background color' item, 'background opacity' item, 'edge type' item, 'edge color' item and the like. The detail item can allow the caption broadcast signal to be selectively set by the viewer, and can also allow the caption broadcast signal to be set at the transmission side.

TABLE 1

| Menu | Viewer's selecting data | Setting of caption provider |
|---|---|---|
| Font Size | Small, Standard, Large | Set By Program |
| Font Style | Font0-Font7 | Set By Program |
| Foreground Color | Black, White, Red, Green, Blue and the like | Set By Program |
| Foreground Opacity | Solid, Transparent, Translucent, Flash | Set By Program |
| Background Color | Black, White, Red, Green, Blue, and the like | Set By Program |
| Background Opacity | Solid, Transparent, Translucent, Flash | Set By Program |
| Edge Type | None, Uniform, Raised, Depressed, Left-Drop Shadow, and Right-Drop shadow | Set By Program |
| Edge Color | Black, White, Red, Green, Blue, and the like | Set By Program |

In the Table 1, the 'font size' item can include three font sizes of small, standard and large that can be selected by the viewer, and the 'Set By Program' for allowing the caption provider's setting.

The 'font style' item can include at least eight different font styles (font0-font7) that can be selected by the viewer, and the 'Set By Program' for allowing the caption provider's setting.

The 'foreground color' item can include at least eight colors (black, white, red, green, blue and the like) that can be selected by the viewer, and the 'Set By Program' for allowing the caption provider's setting.

The 'foreground opacity' item can include four opacities of solid, transparent, translucent and flash, and the 'Set By Program' for allowing the caption provider's setting.

The 'background color' item can include at least eight colors (black, white, red, green, blue and the like) that can be selected by the viewer, and the 'Set By Program' for allowing the caption provider setting.

The 'background opacity' item can include four opacities of solid, transparent, translucent and flash that can be selected by the viewer, and the 'Set By Program' for allowing the caption provider setting.

The 'edge type' item can include edge types such as none, uniform, raised, depressed, left-drop shadow, right-drop shadow and the like, and the 'Set By Program' for allowing the caption provider setting.

The 'edge color', item can include at least eight colors (black, white, red, green, blue and the like) that can be selected by the viewer, and the 'Set By Program' for allowing the caption provider setting.

Accordingly, the viewer can use each of items to selectively set the detail item of the option or to allow the caption provider to set the detail item. That is, if the viewer selectively sets the viewer's selecting data of each of the items, the caption broadcast signal can be set and displayed depending on the selectively set selection data. Or, if the viewer sets each of items to the 'Set By Program' for allowing the caption provider's setting, the caption broadcast signal is displayed as being set by the caption provider. Or, the viewer can also appropriately combine and select user's selecting data and the caption provider's setting item (Set By Program).

The detail item of the option has the user selection data and the caption provider's setting item (Set By Program) every item. Accordingly, the viewer uses the user's selecting data and the caption provider's setting item to set to display the caption broadcast according to his/her fancy.

However, in case where functions of the detail item regulated in the FCC are understood as they are, to set each of the items, there are various complicated drawbacks.

For example, it is assumed that the viewer sets the detail item of the closed caption as in Table 2.

TABLE 2

| Font Size | Large |
|---|---|
| Font Style | Set By Program |
| Foreground Color | Set By Program |
| Foreground Opacity | Set By Program |
| Background Color | Blue |
| Background Opacity | Solid |
| Edge Type | Set By Program |
| Edge Color | Set By Program |

In the Table 2, the viewer can set the font size as 'large', and can set the background color as opaque blue, and can set the other items as the 'Set By Program'.

However, in case where some detail items are set as the viewer's selecting data and remaining detail items are set as the 'Set By Program' as shown in the Table 2, the viewer do not know whether any state type of the caption broadcast signal is displayed on the screen. That is, a related-art does not have a function of applying the set option to a corresponding caption broadcast signal to display the corresponding caption broadcast signal on the screen even though the option of the closed caption is set.

Further, it is assumed that the caption provider sets the option of the closed caption as in Table 3 in case where the viewer sets the detail item of the option as in the Table 2.

TABLE 3

| Font Size | Standard |
|---|---|
| Font Style | Font0 |
| Foreground Color | Blue |
| Foreground Opacity | Solid |
| Background Color | Yellow |
| Background Opacity | Translucent |
| Edge Type | None |
| Edge Color | Not available |

In the Table 3, the caption provider can set the font size as 'standard', and can set the background color as 'translucent yellow', and can set the foreground color as 'translucent blue'.

Accordingly, if the option set by the caption provider of the Table 3 is applied to the option set by the viewer of the Table 2, a final option for actually changing the caption broadcast signal is set in a type of Table 4.

TABLE 4

| Font Size | Large |
|---|---|
| Font Style | Font0 |
| Foreground Color | Blue |
| Foreground Opacity | Solid |
| Background Color | Blue |
| Background Opacity | Solid |

TABLE 4-continued

| Edge Type | None |
|---|---|
| Edge Color | Not available |

At this time, the final option of Table 4 is applied to the caption broadcast signal to be displayed on the screen.

At this time, the applied caption broadcast signal has the same background color as the foreground color, thereby causing the viewer not to acknowledge any character from the caption when the applied caption broadcast signal is displayed. That is, since the foreground color expressing the character is the same as the background color, the character of the foreground color is not distinguished from the background color, thereby causing the viewer not to view any character. Accordingly, the conventional option setting of the closed caption has a drawback in that an unexpected result can be generated, that is, the character cannot be distinguished due to the duplicate of the foreground color and the background color. In this case, if the option set by the viewer can be confirmed on the spot, the above drawback can be solved by again setting the option of the closed caption. However, the conventional art does not have a function of setting the option of the closed caption and at the same time, confirming the caption broadcast signal to which the set option is applied, on the spot.

In the meantime, in case where the viewer intends to set all of eight items, which are included in the option of the closed caption, to the 'Set By Program', the viewer should continuously repeat the setting to the 'Set By Program' every item. Accordingly, this causes the viewer to suffer from great inconvenience and annoyance.

Further, in case where the closed caption is not set to be in a display mode, the caption broadcast signal, which applies the viewer's setting detail item, is not displayed on the screen even though the viewer sets the detail item of the option of the closed caption.

Furthermore, even though the closed caption is set to be in the display mode, the caption broadcast signal is not always provided at the transmission side. Therefore, when the caption broadcast signal is provided at the transmission side, the viewer can confirm a type of caption display by displaying the caption broadcast signal, which applies the viewer's setting detail item, on the screen. At this time, in case where the viewer determines that the displayed caption does not meet with his/her fancy, the detail item of the option should be reset to display the caption broadcast signal, which applies the reset detail item, on the screen. Accordingly, since the above process should be performed until the caption meeting with the fancy is displayed, the viewer suffers from great inconvenience and annoyance.

SUMMARY OF THE INVENTION

Accordingly, the present invention is directed to a management method of an option for caption display that substantially obviates one or more problems due to limitations and disadvantages of the related art.

An object of the present invention is to provide a management method of an option for caption display in which detail items of an option for caption display can be simply set.

Another object of the present invention is to provide a management method of an option for caption display in which a style can be used to control detail items of an option for caption display.

A further another object of the present invention is to provide a management method of an option for caption display in which in case where a style is selected as a caption provider setting (Set By Program), detail items of an option for caption display can be all automatically set by the caption provider (Set By Program).

Still another object of the present invention is to provide a management method of an option for caption display in which in case where a style is selected as a viewer setting (custom), detail items of an option for caption display can be set by the viewer.

A further still another object of the present invention is to provide a management method of an option for caption display in which in case where a style is selected as manufacturer setting (manufacture), detail items predetermined by the manufacturer can be set.

Still Another object of the present invention is to provide a management method of an option for caption display in which in case where detail items of an option are set, the set detail items can be displayed together with a caption-according to the set detail items.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of an option for caption display, including: displaying a detail item for the option for the caption display, the detail item being comprised of a 'Style' item having 'Set By Program', 'Custom' and 'manufacture', and a plurality of lower items; selecting one of the 'Set By Program', the 'Custom' and the 'manufacture' as the 'Style item'; and setting the plurality of lower items depending on the selected 'Style' item.

The 'Style' item can be an item for determining a subject of setting the option for the caption display.

When the 'Style' item is selected, the lower items can be activated.

In case where the 'Set By Program' is selected as the 'Style' item, the plurality of lower items can be all set to be in a state preset by a caption provider.

In case where the plurality of lower items is set to be in the state preset by the caption provider and the viewer sets any one of the plurality of lower items, the 'custom' can be selected as the 'Style' item, and the plurality of lower items is separately set by the viewer.

In case where the 'custom' is selected as the 'Style' item, the plurality of lower items can be separately set by the viewer.

In case where the plurality of lower items is set by the viewer and any one of the plurality of lower items is set to the 'Set By Program', the 'Set By Program' can be selected as the 'Style' item, and the plurality of lower items is all set to be in the state preset by the caption provider.

In case where the 'manufacture' is selected as the 'Style' item, the plurality of lower items can be set to be in a state preset by a manufacturer.

In case where the plurality of lower items is set to be in the state preset by the manufacturer and the viewer sets any one of the plurality of lower items, the 'custom' can be selected as the 'Style' item, and the plurality of lower items is separately set by the viewer.

In case where the plurality of lower items is set to be in the state preset by the manufacturer and any one of the plurality of lower items is set to the 'Set By Program', the 'Set By Program' can be selected as the 'Style' item, and the plurality of lower items is all set to be in the state preset by the caption provider.

At least one 'manufacture' can be provided, and one of them can be selected by the viewer.

A caption display confirmation region can be disposed on a screen for displaying the detail item, and a caption referring to the setting state of the plurality of lower items can be displayed as a preview in the caption display confirmation region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
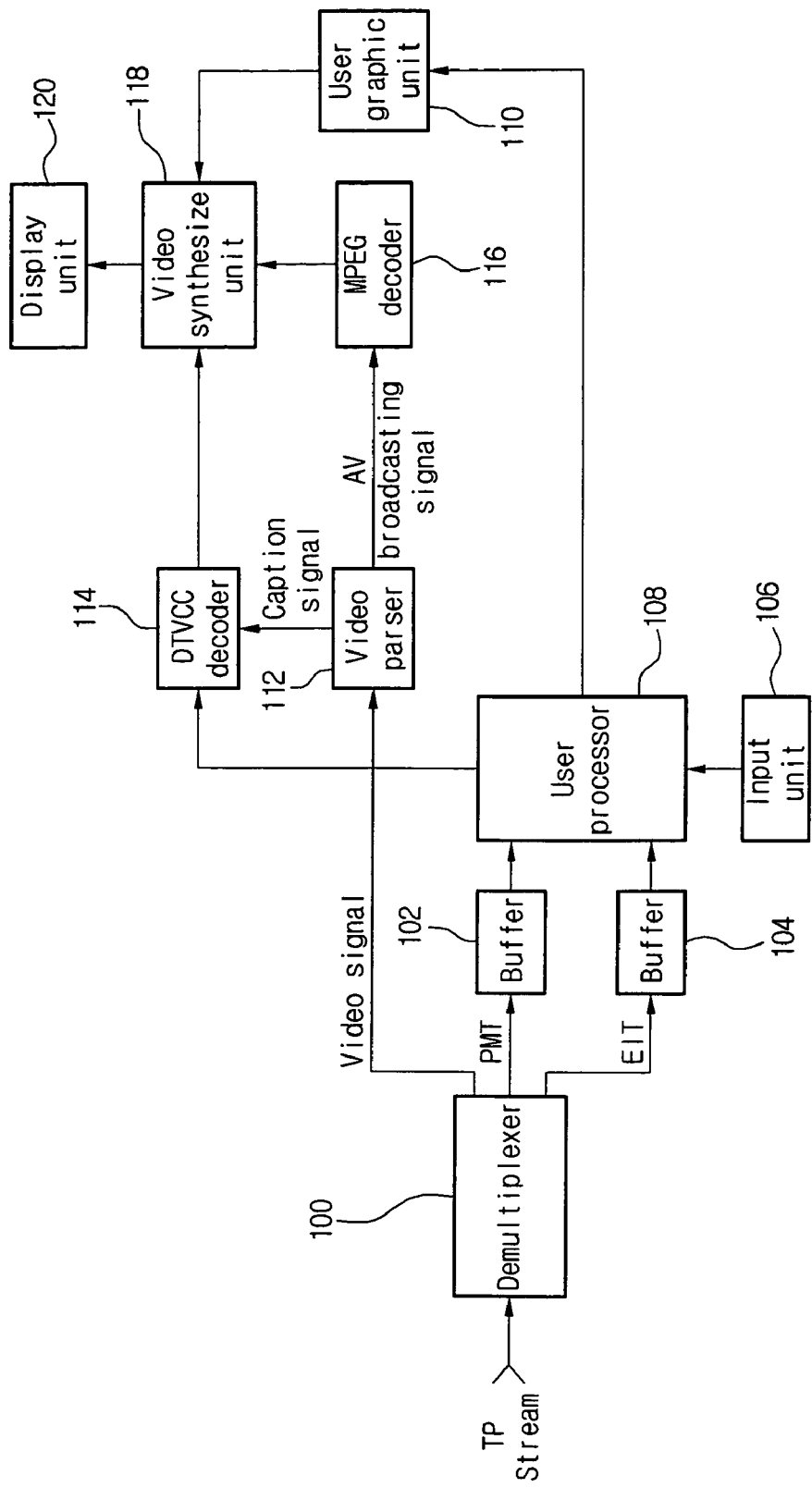
FIG. 1 is a block diagram illustrating a construction of a broadcast receiving apparatus for setting an option of a closed caption according to a preferred embodiment of the present invention.

FIG. 1 is a block diagram illustrating a construction of a broadcast receiving apparatus for setting an option of a closed caption according to a preferred embodiment of the present invention.

Referring to FIG. 1, the inventive broadcast receiving apparatus includes a demultiplexer 100 for demultiplexing a Transport Packet (PT) stream of a broadcast signal received at a tuner (not shown) to extract a video signal, a Program Map Table (PMT) and an Event Information Table (EIT); buffers 102 and 104 for respectively receiving and storing the parsed PMT and EIT from the demultiplexer 100; an input unit 106 for receiving a control command from a viewer; a user processor 108 for controlling a display of a caption signal of a closed caption depending on the stored PMT and EIT and controlling the setting of an option of the closed caption depending on a control command of the input unit 106; a user graphic unit 110 for generating a user graphic signal under the control of the user processor 106; a video parser 112 for parsing a video signal separated in the demultiplexer 100 to separate the caption signal and an AV broadcast signal compressed using MPEG-2; a Digital Television Closed Caption (DTVCC) decoder 114 for decoding the caption signal separated in the video parser 112 under the control of the user processor 108 to generate the caption signal of a viewer's wanting closed caption; an MPEG decoder 116 for decoding the AV broadcast signal separated in the video parser 112; a video synthesize unit 118 for synthesizing output signals of the user graphic unit 110, the DTVCC decoder 114 and the MPEG decoder 116; and a display unit 120 for displaying an image signal synthesized in the video synthesize unit 118.

In the inventive broadcast receiving apparatus, the demultiplexer 100 receives the TP stream of the broadcast signal received at the tuner to extract the video signal, the PMT and the EIT. The separated video signal provided to the video parser 112, and the PMT and the EIT are respectively stored in the buffers 102 and 104. Herein, the broadcast signal is transmitted from a transmission side (broadcasting station) in a format of a stream comprised of a plurality of transport packet units. The broadcast signal can include the video signal, the PMT and the EIT.

The extracted video signal is separated into the caption signal and the MPEG-2 compressed AV broadcast signal by using the video parser 112. After the separated AV broadcast signal is decoded in the MPEG decoder 116, the decoded AV broadcast signal is displayed on the display unit 120 through the video synthesize unit 118. Accordingly, the viewer can view the AV broadcast signal provided from the transmission side. Herein, the display unit 120 can display an image, and can use a Plasma Display Panel (PDP), a Liquid Crystal Display (LCD) and the like.

At this time, the caption signal separated in the video parser 112 can be one of the caption signal for an opened caption and the caption signal for a closed caption. Since the present invention mainly describes the caption signal for the closed caption, the caption signal described henceforth is for the closed caption.

The caption signal for the closed caption can be displayed through the display unit 120 only in case that the viewer intends to view it. Accordingly, the caption signal separated in the video parser 112 is not displayed on the display unit 120 until the caption signal is controlled under the control of the user processor 108 receiving the viewer's control command, and is temporarily stored in the DTVCC decoder 114.

In this state, the viewer can input the control command for the graphic display to the input unit 106 to control the broadcast receiving apparatus. Herein, the input unit can use a remote controller or a touch screen installed on the display unit 120.

In case where the user processor 108 receives the control command for the graphic display from the viewer through the input unit 106, it controls the user graphic unit 110 to generate the user graphic signal, thereby the generated graphic signal through the video synthesize unit 118 and the display unit 120. Accordingly, the viewer can view a user graphic picture to control the broadcast receiving apparatus.

At this time, the viewer can select and confirm the option of the closed caption through the user graphic picture, and can set the option of the closed caption through a predetermined control command.

After the option of the closed caption is set as above, the viewer can view the caption signal for the closed caption referring to the set option of the close caption. That is, if the viewer inputs the control command for the display of the caption signal for the closed caption to the input unit 106, the user processor 108 receives the control command for the display of the caption signal for the closed caption to control the DTVCC decoder 114. Under the control thereof, the DTVCC decoder 114 decodes the caption signal for the closed caption, which is separated in the video parser 112 and temporarily stored, to allow the decoded caption signal to be displayed through the video synthesize unit 118 and the display unit 120.

Hereinafter, a method of managing the option of the closed caption in the inventive broadcast receiving unit will be described.

Figure 2:
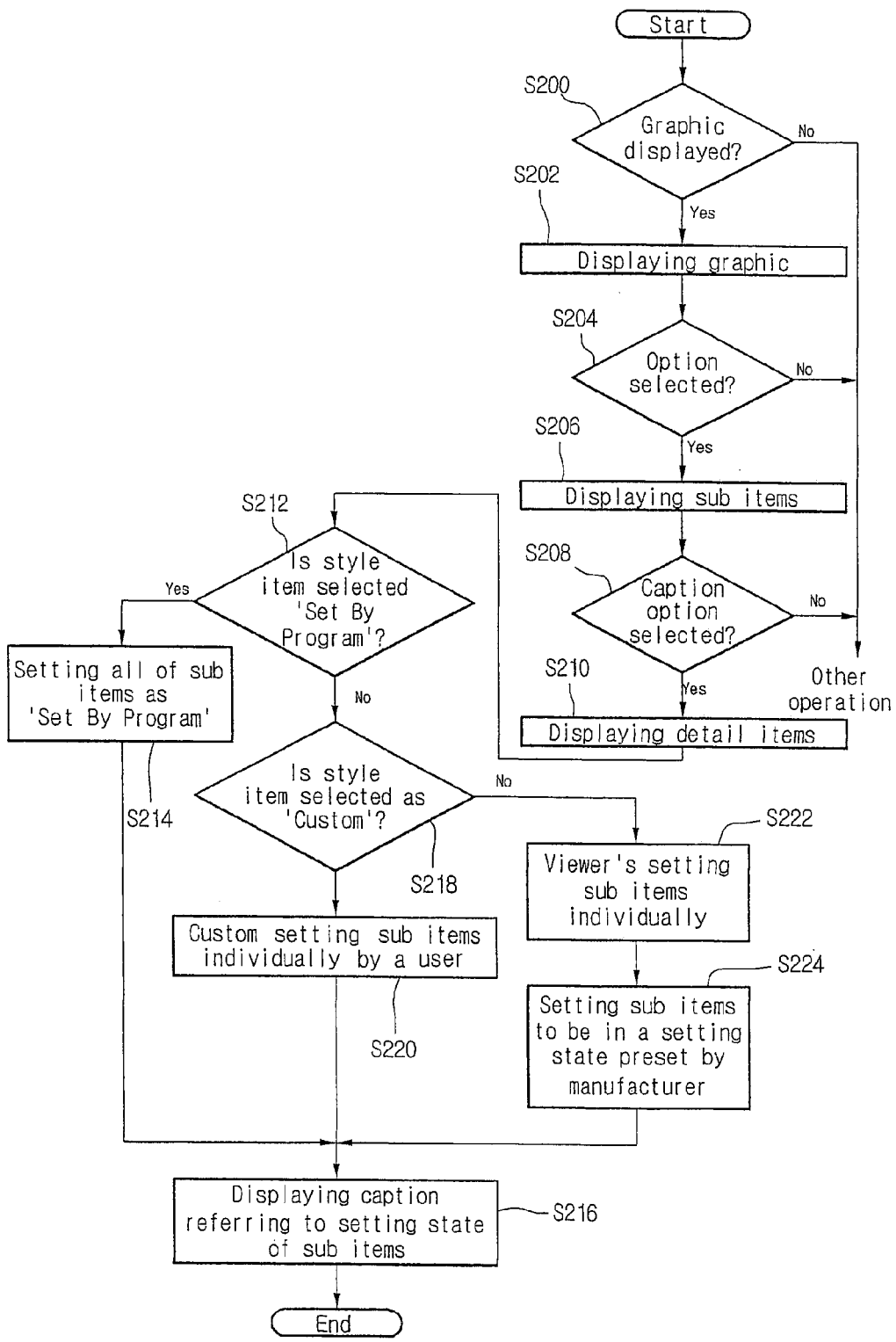
FIG. 2 is a flowchart illustrating a management method of an option of a closed caption according to a preferred embodiment of the present invention.

FIG. 2 is a flowchart illustrating a management method of the option of the closed caption according to a preferred embodiment of the present invention.

Referring to FIGS. 1 and 2, in case where the viewer intends to request the graphic display, the viewer inputs the control command for the graphic display to the input unit (S200).

Figure 3:
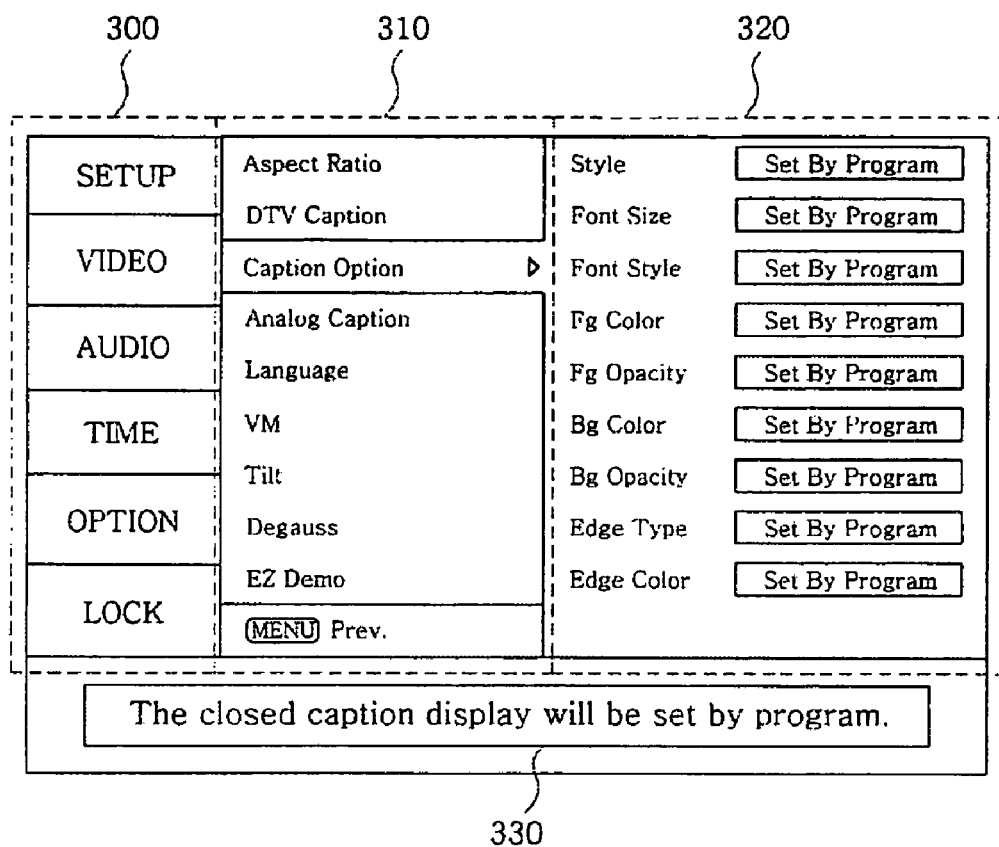
FIGS. 3 to 5 are views illustrating examples of a screen display state depending on setting of an option of a closed caption of FIG. 2.

Accordingly, the user processor 108 controls the user graphic unit 110 under the received control command for the graphic display to generate the user graphic. The generated user graphic is displayed on the screen through the video synthesize unit 118 and the display unit 120 (S202). As shown in FIG. 3, main items 300 such as 'SETUP' item, 'VIDEO' item, 'AUDIO' item, 'TIME' item, 'OPTION' item, 'LOCK' item can be displayed on a user graphic screen.

In case where the viewer selects the 'OPTION' item among the main items 300 (S204), the user processor 108 controls the user graphic unit 110 to display various sub items 310 belonging to the 'OPTION' item on the user graphic screen (S206). Herein, as shown in FIG. 3, the sub items 310 can include 'Aspect Ratio' item, 'DTV caption' item, 'Caption option' item, 'Analog option' item, 'Language' item, 'VM' item, 'Tilt' item, 'Degauss' item, 'EZ Demo' item and the like.

At this time, in case where the viewer selects the 'Caption option' item among the various sub items 310, the user processor 108 controls the user graphic unit 110 to display various detail items 320 belonging to the 'Caption option' item on the user graphic screen (S210). Herein, as shown in FIG. 3, the detail items 320 can include 'Style' item, 'Font Size' item, 'Font Style' item, 'Foreground Color' item, 'Foreground Opacity' item, 'Background Color' item, 'Background Opacity' item, 'Edge Type' item, 'Edge Color' item and the like.

Among the detail items 320 of FIG. 3, the 'Style' item denotes an upper item, and remaining items denote lower items which can be activated depending on the selection of the 'Style' item. That is, only after the upper item is selected, the lower items can be activated and set.

The 'Style' item determines a subject of setting when the option for the caption signal of the closed caption is set. That is, the 'Style' item can include 'Set By Program' that means the setting of the caption provider, 'Custom' that means the setting of the viewer, 'manufacture' that means the setting of the manufacturer manufacturing the broadcast receiving apparatus and the like. Herein, at least one 'manufacture' can be provided. That is, several 'manufacture' can be made by the manufacturer manufacturing the broadcast receiving apparatus. At this time, in case where several 'manufacture' is provided, the number of identifying each of 'manufacture' can be given. For example, 'manufacture1', 'manufacture2', 'manufacture3' and the like can be given. Accordingly, the viewer can select one of the 'Set By Program', the 'Custom' and the 'manufacture' belonging to the 'Style item'.

In case where the viewer selects the 'Style' item as the 'Set By program' (S212), the user processor 108 sets the lower items excepting the 'Style' item among the detail items 320, that is, all of the 'Font Size' item, the 'Font Style' item, the 'Foreground Color' item, the 'Foreground Opacity' item, the 'Background Color' item, the 'Background Opacity' item, the 'Edge Type' item, the 'Edge Color' item and the like to the 'Set By Program' (S214). In case where all of the lower items are set by using the 'Set By Program' as above, the lower items are set to be in a state preset by the caption provider. Accordingly, the state preset by the caption provider is referred to the caption signal to be displayed in a caption display confirmation region 330.

Accordingly, a predetermined caption signal is displayed depending on the setting state of the detail item, which is set by the caption provider, in the caption display confirmation region 330 of the display unit 120 to allow the viewer to confirm an option setting state of the closed caption (S216). That is, the 'Style' item of the detail items of the option of the closed caption is selected as the 'Set By Program' and accordingly, all of the lower items are set to the 'Set By Program' such that the lower items set by the caption provider of the transmission side (broadcasting station), not the lower items selected by the viewer, are referred to the predetermined caption signal to be displayed in the caption display confirmation region 330. At this time, the viewer cannot have even any choice about the detail items, and only the setting state provided by the caption provider is referred to the predetermined caption signal. In this case, as shown in FIG. 3, "The closed caption display will be set by program" can be displayed in the caption display confirmation region 330. Accordingly, the viewer can confirm a state of the caption displayed in the caption display confirmation region 330 through a preview.

Actually, the caption signal referring to the setting state of the detail item of the option, which is set by the caption provider, is not always provided from the transmission side. Therefore, even though the viewer sets the 'Style' item to 'Set By Program', the caption signal referring to the setting state of the detail item of the option, which is set by the caption provider, is not at once displayed in the caption display confirmation region 330. Therefore, in case where the viewer selects the 'Style' item as the 'Set By Program', the present invention can display the caption signal, which has a general setting state, for example, a white letter with a black background, a standard font size and the like, in the caption display confirmation region 330.

Figure 4:
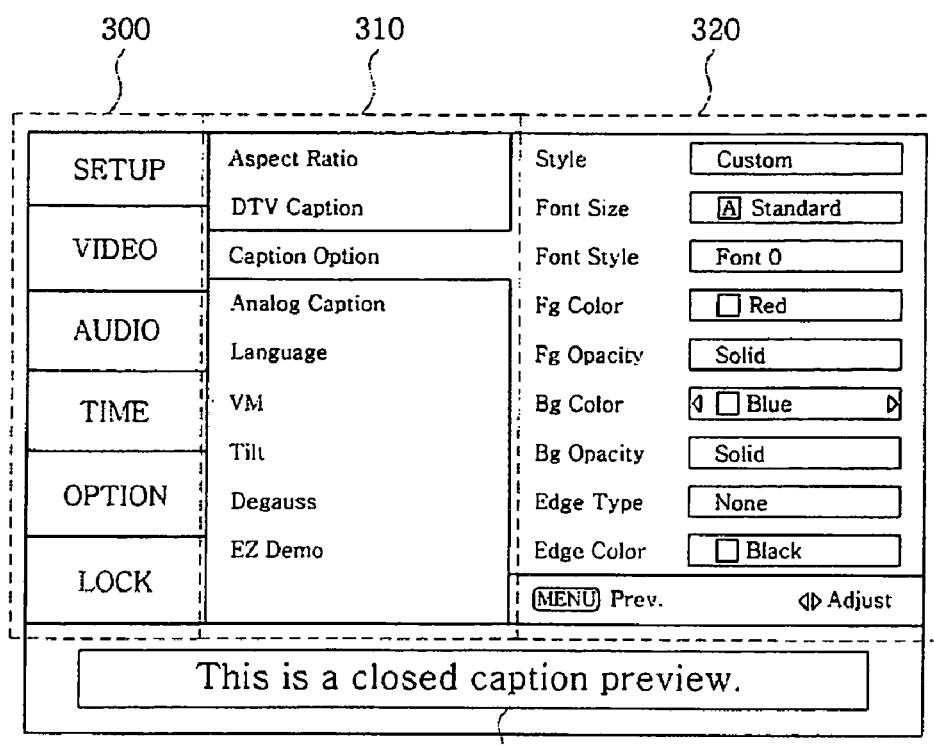

In case where the viewer selects the 'Style' item as the 'Custom' as shown in FIG. 4 (s128), the lower items of the 'Style' item are not automatically set to the 'Set By Program', and the viewer separately sets each of the lower items.

At this time, the viewer can separately set the lower items, that is, all of the 'Font Size' item, the 'Font Style' item, the 'Foreground Color' item, the 'Foreground Opacity' item, the 'Background Color' item, the 'Background Opacity' item, the 'Edge Type' item, the 'Edge Color' item and the like.

For example, the viewer can select one of 'Small', 'Standard', 'Large' in the 'Font Size' item, and can select one of 'Black', 'White', 'Red', 'Green', 'Blue' and the like in the 'Foreground Color' item. The viewer can separately set even remaining lower items.

Accordingly, a predetermined caption signal is displayed in the caption display confirmation region 330 of the display unit 120 according to the setting state of the detail items, which is separately set by the viewer, such that the viewer can confirm the option setting state of the closed caption (S216).

Figure 5:
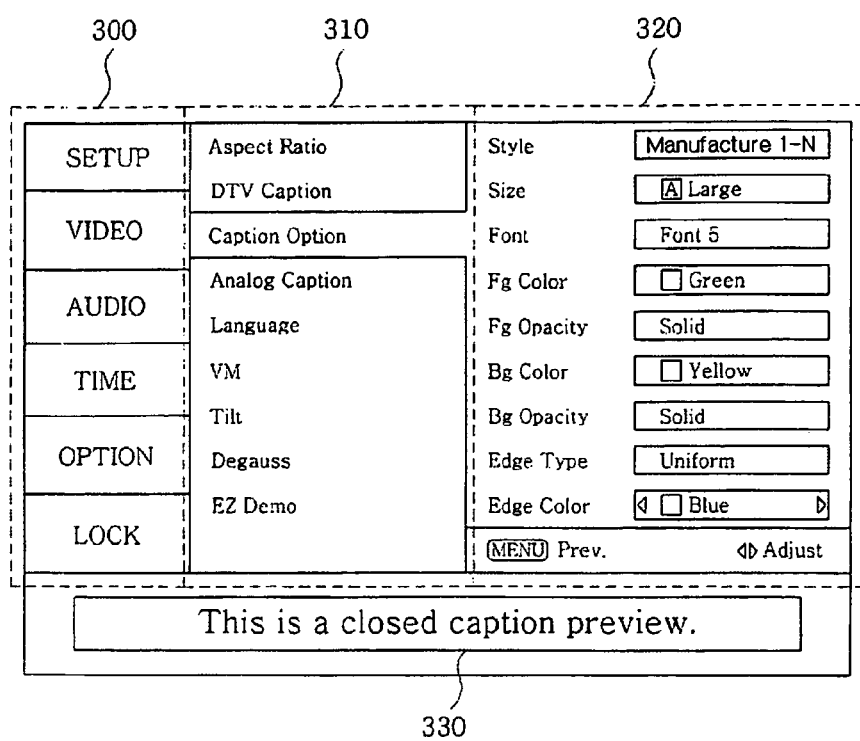

In the meantime, in case where the viewer does not select the 'Style' item, which is the upper item, as the 'Set By Program' or the 'Custom', the 'manufacture' is automatically selected as shown in FIG. 5 (S222). Herein, the 'manufacture' means that the manufacturer manufacturing the broadcast receiving apparatus sets the detail item of the option. At this time, the 'manufacture' can be severally provided, and can be set as the detail items, which are different from one another, every 'manufacture'.

In case where the viewer selects one of the several 'manufacture' as the 'Style' item, the preset state is automatically displayed and set in each of the lower items according to the viewer's selecting 'manufacture' (S224). At this time, in case where the viewer selects a different 'manufacture' as the 'Style' item, the preset state can be automatically displayed and set in each of the lower items according to the selected different 'manufacture'. As such, the viewer can select one of the several 'manufacture'.

Accordingly, the predetermined caption signal is displayed in the caption display confirmation region 330 of the display unit 120 according to the setting state of the detail items set by the manufacturer such that the viewer can confirm the option setting state of the closed caption (S216).

At this time, the setting state can be variously set depending on notion and fancy of the manufacturer manufacturing the broadcast receiving apparatus.

The above-described present invention describes an example of the case where the viewer cannot change the detail items when the 'Style' item is selected as the 'Set By Program' or the 'manufacture', but can allow the viewer to change the detail items even though the viewer selects the 'Style' item as the 'Set By program' or the 'manufacturer'.

Further, in case where any one of the detail items is set to the 'Set By Program' in a state where the 'Style' item is set to the 'custom', all of the detail items including the 'Style' item can be changed to the 'Set By Program'.

Furthermore, in case where the viewer sets even any one of the detail items in a state where the 'Style' item is set to the 'Set By Program', the 'custom' can be selected as the 'Style' item, and the plurality of lower items can be separately set by the viewer.

Additionally, in case where the viewer sets even any one of the detail items in the state where the 'Style' item is set to the 'manufacture', the 'custom' can be selected as the 'Style' item, and the plurality of lower items can be separately set by the viewer.

Further, in case where any one of the detail items is set to the 'Set By Program' in the state where the 'Style' item is set to the 'manufacture', the 'Set By Program' can be selected as the 'Style' item, and all of the plurality of lower items can be set to the state preset by the caption provider.

As described above, the present invention has an effect in that in a North-United State standard of the closed caption, the viewer can simply set the detail items of the option, and the predetermined caption signal can be displayed according to the setting state of the detail item in the caption display confirmation region to set and concurrently confirm the detail item, thereby allowing the viewer to set the detail item depending on his/her fancy.

Further, the present invention has an effect in that the 'Style' items are provided in the detail item to determine a setting subject such that only the corresponding subject (viewer, caption provider, and manufacturer) can set the detail items, thereby preventing the caption from not being displayed due to the detail items in which several subjects are set.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A management method for setting caption display style, the method comprising:
   receiving a broadcast signal;
   parsing a video signal and a closed caption signal from the broadcast signal;
   displaying a caption style setting menu for setting caption display style, the caption style setting menu being comprised of a selectable item of a 'Set By Program' and a 'Custom' item, and each of the selectable item having a plurality of caption style attributes and displaying the plurality of caption style attributes of at least one of the selectable item; and selecting one of the 'Set By Program' and the 'Custom' item in the caption style setting menu, wherein, when the 'Custom' item is selected activating the plurality of caption style attributes for viewer selection, decoding a caption text from the closed caption signal, setting the plurality of caption style attributes depending on a viewer setting and wherein if any one of the plurality of caption style attributes has a selection for 'Set by program' and when the 'Set by program' is selected for any one of the plurality of caption style attributes by a viewer in a state the 'Custom' item is selected, automatically setting all of the plurality of caption style attributes as 'Set by program', generating a user graphic information, combining the caption text, the video signal and the user graphic information according to the plurality of caption style attributes set by the viewer, displaying a caption preview in a caption display confirmation region to display a sample of a caption text and the caption display style according to the plurality of caption style attributes set by the viewer and displaying the caption text according to the plurality of caption style attributes set by the viewer, and when the 'Set By Program' is selected, decoding a caption text and a caption style information from the closed caption signal automatically, setting the plurality of caption style attributes depending on the decoded caption style information, generating a user graphic information, combining the caption text, the video signal and the user graphic information according to the plurality of caption style attributes set by the decoded caption style information.

2. A management device for setting caption display style, the device comprising:
- a receiving unit configured to receive a broadcast signal;
- a video parser configured to parse a video signal and a closed caption signal from the broadcast signal;
- a display unit configured to display a caption style setting menu for setting caption display style, the caption style setting menu being comprised of a selectable item of a 'Set By Program' and a 'Custom' item, and the selectable item having a plurality of caption style attributes and configured to display the plurality of caption style attributes of at least one of the selectable item;
- a user command receiver unit configured to select one of the 'Set By Program' and the 'Custom' item in the caption style setting menu; and
- a processor configured to control, when the 'Custom' item is selected activating the plurality of caption style attributes for viewer selection, decoding a caption text from the closed caption signal, setting the plurality of caption style attributes depending on a viewer setting and wherein if any one of the plurality of caption style attributes has a selection for 'Set by program' and when the 'Set by program' is selected for any one of the plurality of caption style attributes by a viewer in a state the 'Custom' item is selected, automatically setting all of the plurality of caption style attributes as 'Set by program', generating a user graphic information, combining the caption text, the video signal and the user graphic information according to the plurality of caption style attributes set by the viewer, displaying a caption preview in a caption display confirmation region to display a sample of a caption text and the caption display style according to the plurality of caption style attributes set by the viewer and displaying the caption text according to the plurality of caption style attributes set by the viewer, and when the 'Set By Program' is selected, decoding a caption text and a caption style information from the closed caption signal automatically, setting the plurality of caption style attributes depending on the decoded caption style information, generating a user graphic information, combining the caption text, the video signal and the user graphic information according to the plurality of caption style attributes set by the decoded caption style information, and displaying the caption text according to the plurality of caption style attributes set by the decoded caption style information.

3. A management method for setting caption display style, the method comprising:
- receiving a broadcast signal;
- displaying a caption style setting menu for setting caption display style, the caption style setting menu being comprised of a selectable item of a 'Set By Program' and a 'Custom' item, and the selectable item having a plurality of caption style attributes and displaying the plurality of caption style attributes of at least one of the selectable item; and
- selecting one of the 'Set By Program' and the 'Custom' item in the caption style setting menu;

wherein, when the 'Custom' item is selected activating the plurality of caption style attributes for viewer selection, decoding a caption text from the closed caption signal, setting the plurality of caption style attributes depending on a viewer setting and wherein if any one of the plurality of caption style attributes has a selection for 'Set by program' and when the 'Set by program' is selected for any one of the plurality of caption style attributes by a viewer in a state the 'Custom' item is selected, automatically setting all of the plurality of caption style attributes as 'Set by program', generating a user graphic information, combining the caption text, the video signal and the user graphic information according to the plurality of caption style attributes set by the viewer, displaying a caption preview in a caption display confirmation region to display a sample of a caption text and the caption display style according to the plurality of caption style attributes set by the viewer and displaying the caption text according to the plurality of caption style attributes set by the viewer, and when the 'Set By Program' is selected automatically, decoding a caption text and a caption style information from the closed caption signal, setting the plurality of caption style attributes depending on the decoded caption style information, generating a user graphic information, combining the caption text, the video signal and the user graphic information according to the plurality of caption style attributes set by the decoded caption style information, displaying the caption text according to the plurality of caption style attributes set by the decoded caption style information, and the caption preview displayed in the caption display confirmation region is deleted.

* * * * *